United States Patent Office 3,248,148
Patented Apr. 26, 1966

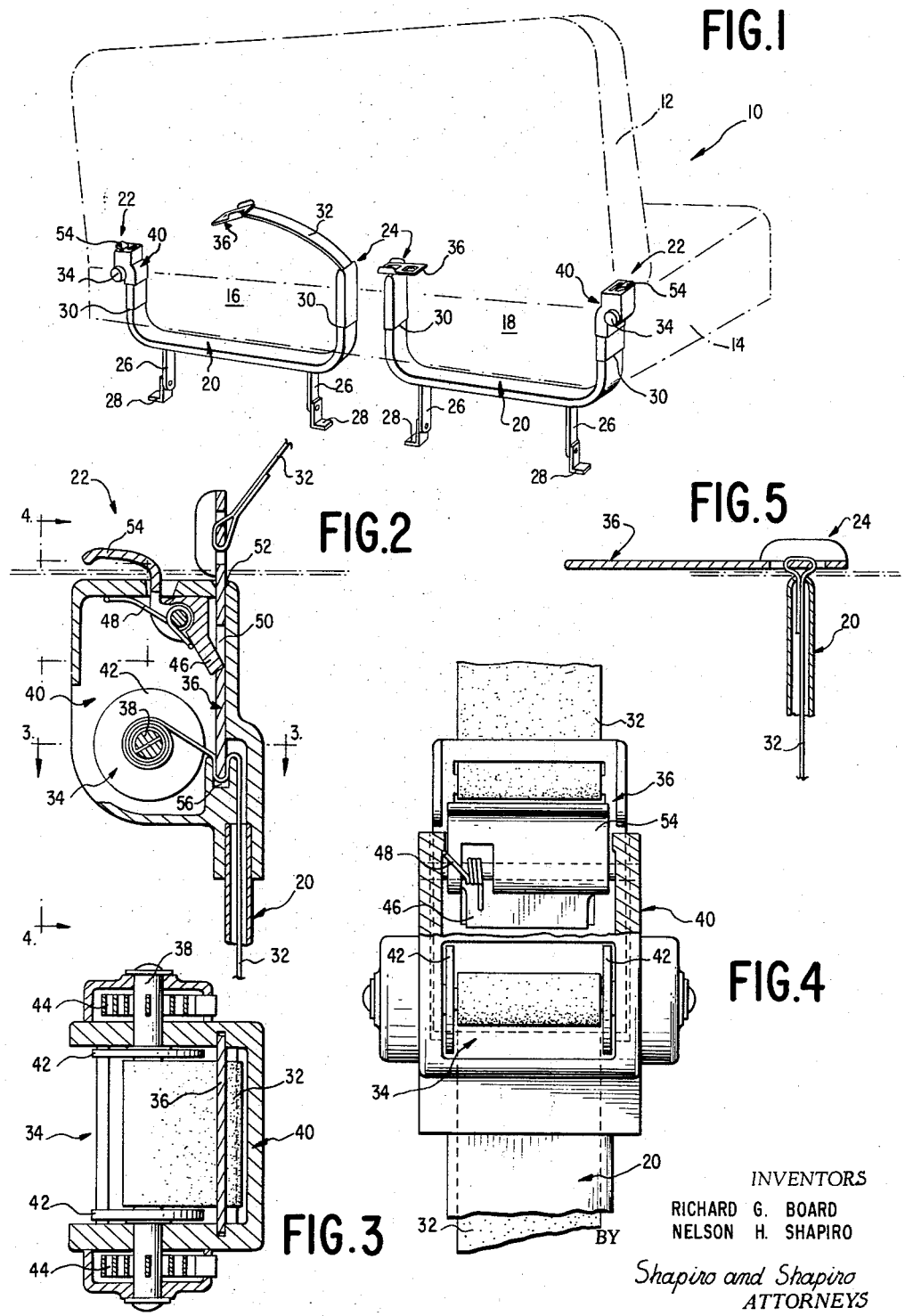

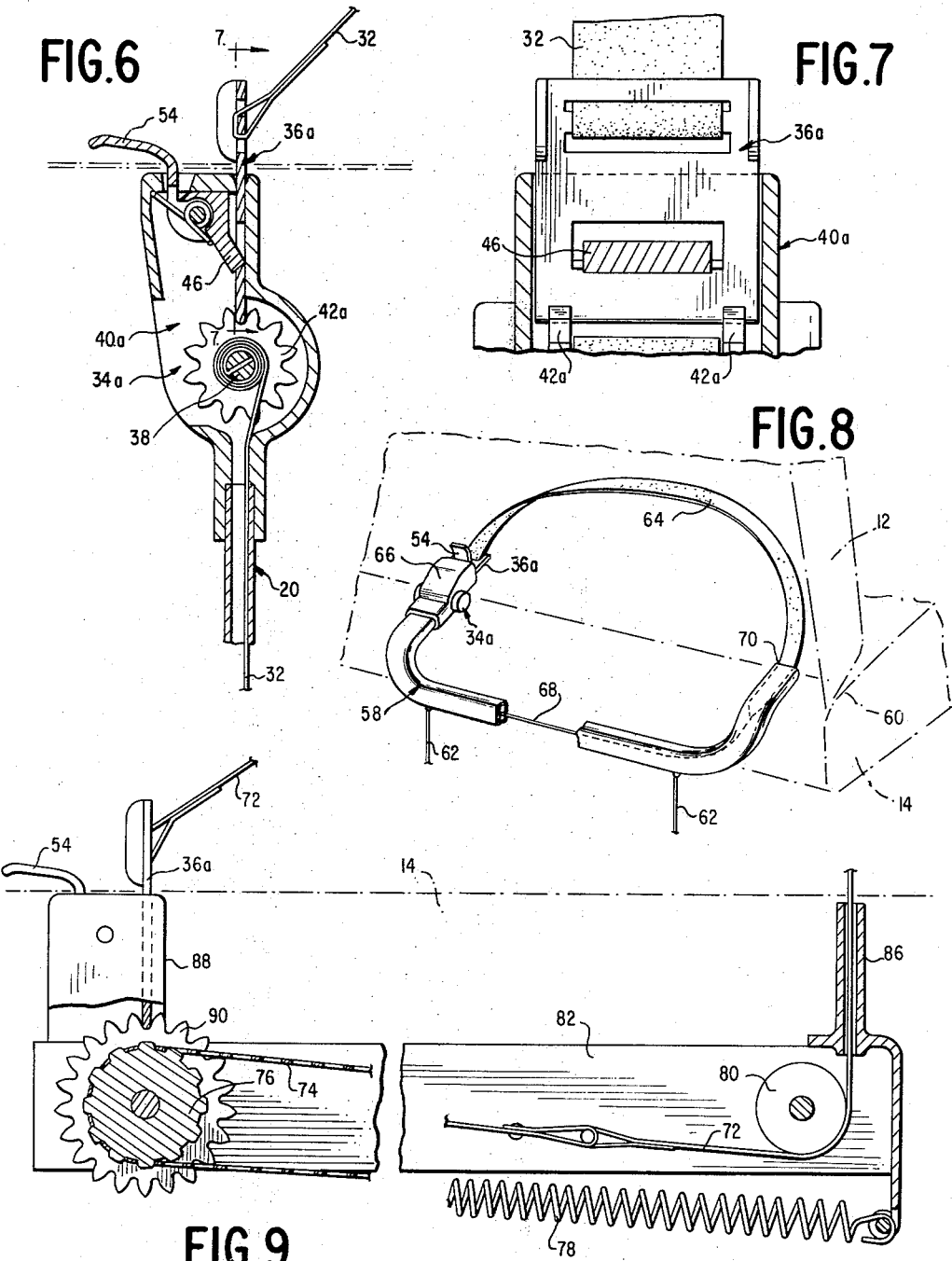

3,248,148
RETRACTABLE SAFETY BELTS
Richard G. Board, Bethesda, Md. (3000 Connecticut Ave., Washington, D.C.), and Nelson H. Shapiro, Hyattsville, Md. (801 Washington Bldg., Washington, D.C.)
Filed July 31, 1963, Ser. No. 298,914
6 Claims. (Cl. 297—388)

This invention relates to retractable safety belts, and more particularly to so-called "seat belts" for use in automotive vehicles.

The applicants' co-pending application Serial No. 273,696, filed April 17, 1963, discloses and claims retractable seat belts in which the length of the belt becomes fixed upon engagement of a pair of fasteners and which retract automatically upon disengagement of the fasteners. While the seat belts of the co-pending application may be provided as a custom installation during the manufacture of automotive vehicles, they are especially adapted to installation in existing vehicles. The seat belts disclosed and claimed in the present application differ from the conventional two-strap floor-anchored arrangement and are especially adapted for custom installation during the manufacture of new vehicles. It is accordingly a principal object of the invention to provide improved retractable seat belts.

Another object of the invention is to provide improved seat belts requiring only one retracting device and only one strap per belt.

A further object of the invention is to provide improved retractable seat belts which are neat and unobtrusive in appearance but which nevertheless meet desired safety standards.

Still another object of the invention is to provide retractable seat belts which may be readily adjusted in length until the belt is fastened, after which the length is fixed.

A still further object of the invention is to provide improved seat belts which permit the use of simple retracting devices, which accommodate seat adjustment, and which nevertheless may be firmly anchored to the floor or frame of the vehicle.

Briefly stated, and without limitation, in one embodiment a seat belt of the invention extends from a retracting reel adjacent one side of a seat through a guide channel beneath the seat to an outlet at the other side of the seat. A fastener attached to the end of the belt at the outlet may be grasped to draw the belt across the lap of the user. The fastener is engaged with a mating fastener adjacent the reel so as to fix the length of the belt. When the fasteners are disengaged, the belt automatically retracts to return the first-mentioned fastener to the outlet. The guide channel may be pivotally connected to the floor of the vehicle and may have telescoping side portions to accommodate movement of the seat. Regardless of the seat position, once the belt fasteners are engaged, a fixed-length loop is firmly anchored to the floor of the vehicle.

The foregoing and other objects, and advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 1 is a perspective view, partly in phantom lines, illustrating one form of seat belt installation in accordance with the invention;

FIGURE 2 is a vertical sectional view illustrating details of the fastening and retracting mechanism in accordance wtih one embodiment of the invention;

FIGURE 3 is a sectional view taken along line 3—3 of FIGURE 2;

FIGURE 4 is a sectional view taken along line 4—4 of FIGURE 2;

FIGURE 5 is a sectional view illustrating a detail of a fastener and guide channel outlet of the invention;

FIGURE 6 is a sectional view of a modified form of retracting and fastening apparatus in accordance with the invention;

FIGURE 7 is a sectional view taken along line 7—7 of FIGURE 6;

FIGURE 8 is a perspective view, partly broken away and partly in phantom lines, illustrating a modification of the invention; and FIGURE 9 is a sectional view illustrating still another modification of the invention.

Referring to the drawings, and initially to FIGURE 1 thereof, reference numeral 10 designates a seat of an automotive vehicle, the seat including an upper or back portion 12 and a lower portion 14 which may be fixed to the floor of the vehicle or adjustable longitudinally of the vehicle in a conventional manner. Two seat belt installations 16 and 18 of the invention are shown for illustrative purposes, although it will be understood that the number of installations may be chosen in accordance with the number of vehicle occupants to be accommodated. In the form shown each installation comprises a guide channel 20 which extends between spaced points 22 and 24 on the lower seat portion 14 located at the sides of the lower seat portion normally occupied by the user. The guide channel may be substantially U-shaped, having vertical arms which extend downwardly through the lower seat portion 14 and a horizontal bight which extends through or under the lower seat portion. Although the guide channels are shown as substantially continuous tubes, it will become apparent hereinafter that spaced, separate guide elements may be employed. The bight portion of each guide channel is shown firmly anchored to the floor of the vehicle by means of links 26 pivotally connected to the bights and to floor mounting brackets 28. By this arrangement forces may be transmitted from the bights of the guide channels to the floor (or frame) of the vehicle and yet the guide channels may move to accommodate adjustment of the seat position. Where the seat itself is anchored to the floor securely enough to withstand collison forces, the guide channels need only be securely attached to the seat. Moreover, other types of anchoring arrangement, such as those employing cables or webbing, may be utilized instead of the links 26. The vertical arms of the guide channels may telescope, so that the upper portions of the arms may remain fixed to the seat regardless of the seat position. Instead of the telescoping arms 30, the arms may be formed in two spaced pieces with a gap therebetween.

Each installation includes a seat belt 32 constituting an elongated flexible restraining member, which may be formed of conventional webbing for example, which extends through the channel 20 from a retracting reel 34 adjacent point 22. The free end of the belt passes through the outlet of the guide channel at 24 and is provided with a fastener 36. The guide channel is essentially a flat tube having a cross-section dimensioned to facilitate the guiding of the belt 32. Fastener 36 may be a flat metal plate secured to the end of belt 32 and shaped to be unobtrusive and conveniently grasped. As shown in FIGURE 5, fastener 36 cannot pass into the guide channel and is arranged to lie flat adjacent the outlet of the guide channel, which may be simply an opening in the lower seat portion.

As shown in FIGURES 2 and 3, the reel may have an arbor 38 supported for rotation in a housing 40, a pair of end discs 42, and a pair of spiral power springs 44 which turn the arbor relative to the housing. Belt 32 passes from the guide channel 20 into the housing 40 and is wound upon the reel 34, the end of the belt being fixed to the reel arbor. It is apparent that when the fastener 36 is at rest adjacent point 24, the belt is wound upon the reel and that when the fastener is grasped and pulled, the belt unwinds from the reel. If the fastener is then released, the belt will rewind upon the reel automatically. Housing 40 and the outlet portion of channel 20 adjacent point 24 may be fixed to the lower seat portion 14 in any conventional manner. Furthermore, the positions of the housing and the outlet may be reversed if desired.

Housing 40 is provided with means for engaging and locking the fastener 36 in the housing. As shown in FIGURE 2, this means may comprise a pivotally mounted latch 46 biased by a spring 48 so as to insert the latch within a corresponding opening 50 of the fastener 36 when the fastener is inserted through an opening 52 at the top of the housing. The fastener may be released by pulling upon release lever 54 exposed at the top of the housing.

As the belt 32 passes off the reel 34, it passes over a well 56 formed in housing 40 below slot 52. When the fastener 36 is inserted into the housing, the tip of the fastener forces the belt into the well, causing the belt to follow a tortuous path about the tip of the fastener and thereby jamming the belt, so that it cannot be pulled further from the reel. The sides of the well and/or the tip of the fastener may be roughened to facilitate the jamming action. The belt is thus fixed in length automatically upon insertion and locking of the fastener 36 in housing 40. As will be seen more fully hereinafter, the locking and length-fixing apparatus just described are merely representative of many different forms of such apparatus which may be empolyed in accordance with the principles of the invention.

From the foregoing description, it is apparent that when the fastener 36 has been locked in housing 40, a belt of fixed length is looped about the user. The bottom of the loop is firmly attached to the floor or frame of the vehicle by means of the links 26.

FIGURE 6 illustrates a modification of the apparatus for fixing the length of the belt 32 upon insertion of the fastener 36a in the housing 40a to engage the latch 46. As shown in FIGURES 6 and 7, in this form of the invention the retracting reel 34a has serrated end discs 42a rigidly attached to the arbor 38. When the fastener 36a is inserted, its tip enters between serrations of the end discs and locks the reel in position. Since the reel cannot turn after insertion of the fastener, the belt becomes a fixed-length loop.

FIGURE 8 illustrates a modification of the invention in which a guide channel 58 is shaped and mounted so as to extend through the opening 60 at the crotch of the seat, the bight of the guide channel being behind (or below) the seat. The guide channel may be secured to the floor or frame by means of flexible cables 62 or other appropriate elements. The belt 64 has a fastener 36a which may be inserted within a housing 66 so as to be locked therein and in turn to lock a reel 34a as described in connection with FIGURE 6, for example. Instead of winding the belt directly upon the reel, the end of the belt may be attached to a flexible cable 68, which is wound upon the reel as a part of the restraining member. This permits the use of a smaller reel. When the latch-release lever 54 is actuated, the fastener 36a is released, and the belt is retracted so as to position the fastener at the outlet 70 of the guide channel. The guide channel may be fixed to the seat in any conventional manner.

FIGURE 9 illustrates a modification of the invention in which a belt 72 is attached at one end to a flat chain 74 or similar flexible perforated member so that the chain and belt form the restraining member. The chain passes over a sprocket wheel 76 and is attached to one end of a coil tension spring 78, the other end of which is fixed. The belt passes over an idler roller 80 which, like sprocket wheel 76, is rotatably supported upon a transverse frame member 82. Frame member 82 may be mounted within or below the lower seat portion 14, so that the guide channel 86 and the housing 88 at opposite ends of the frame member extend upwardly substantially to the level of the seat surface. As in the other forms of the invention described, the fastener 36a may be inserted into the housing 88 to be locked therein. The tip of the fastener enters between the serrations of a serrated locking disc 90 fixed to the sprocket wheel 76. This prevents further movement of the chain 74 about the sprocket wheel and fixes the length of the belt 72. When the latch release lever 54 is actuated, fastener 36a is released, and spring 78 retracts the belt until fastener 36a lies at the outlet of guide channel 86.

While preferred embodiments of the invention have been shown and described, it will be apparent to those skilled in the art that changes can be made without departing from the principles and spirit of the invention, the scope of which is defined in the appended claims. For example, different parts of the various embodiments can be interchanged. Different forms of locking, length-fixing, and retracting apparatus can be employed. Where the tip of the belt fastener is utilized to fix the length of the belt, it may be utilized indirectly, as by depressing a latch which locks a reel or enters an opening in a perforated member affixed to the belt, for example. Moreover, within the broader aspects of the invention, the reel or other retracting device need not be located immediately adjacent the locking mechanism. Accordingly, the foregoing embodiments are to be considered illustrative, rather than the restrictive of the invention, and those modifications which come within the meaning and range of equivalency of the claims are to be included therein.

The invention claimed is:

1. A retractable seat belt comprising a retraction device, an elongated flexible restraining member connected to said device for retraction and extension and having an end provided with a fastener member, guide means for training said restraining member from a first location at one side of a vehicle seat to a second location at the other side of the seat at which said fastener member is located when said restraining member is retracted, whereby said fastener member may be grasped to draw the restraining member across the lap of a user from said other side to said one side of the seat, said restraining member passing from said retraction device to said first location and then to said second location at all times, means for releasably retaining said fastener member at said one side of said seat with said restraining member extended to any selected length within a wide range of lengths, and means operative when said fastener member is so retained for joining said end of said restraining member to the portion of said restraining member at said first location in an inextensible loop surrounding the user, said guide means defining a fixed-length portion of said loop transverse to and beneath said user.

2. The retractable seat belt of claim 1, said joining means comprising means for locking said retraction device against extensile movement.

3. The retractable seat belt of claim 1, said retraction device comprising a reel mounted adjacent to a receptacle, said means for retaining said fastener member comprising means for retaining asid member in said receptacle.

4. The retractable seat belt of claim 3, said joining means comprising means in said receptacle responsive to insertion of said fastener member.

5. The retractable seat belt of claim 1, said joining means comprising clamping means actuated by said fastener member.

6. The retractable seat belt of claim 5, said clamping means comprising a pair of clamp elements arranged to engage opposite sides of said restraining member, one of said elements being movable by said fastener member.

References Cited by the Examiner

UNITED STATES PATENTS

| | | | |
|---|---|---|---|
| 2,468,560 | 4/1949 | Kirkpatrick | 297—388 |
| 2,725,097 | 11/1955 | Thoreson | 297—388 |
| 2,822,595 | 2/1958 | Ruhl | 24—170 |
| 2,945,275 | 7/1960 | Almeter | 297—385 |
| 2,964,100 | 12/1960 | McCall | 297—388 |
| 2,964,815 | 12/1960 | Serino | 24—75 |
| 2,972,173 | 2/1961 | Weber | 24—171 |
| 3,020,089 | 2/1962 | Monroe | 297—388 |
| 3,065,027 | 11/1962 | Misslich et al. | 297—388 |
| 3,078,536 | 2/1963 | Bauer | 24—136 X |
| 3,147,996 | 9/1964 | Ferrara et al. | 297—388 |

FOREIGN PATENTS 548,240  11/1957  Canada.

FRANK B. SHERRY, *Primary Examiner.*